United States Patent [19]

Motamed et al.

[11] Patent Number: 5,646,751
[45] Date of Patent: Jul. 8, 1997

[54] ENCODING METHOD FOR DEFERRED ANTI-ALIASING

[75] Inventors: Margaret Motamed, Redondo Beach; Jeffrey N. Kellman, Hawthorne, both of Calif.

[73] Assignee: Xerox Corporation, Stamford, Conn.

[21] Appl. No.: 452,625

[22] Filed: May 25, 1995

[51] Int. Cl.$^6$ .................... G03F 3/08; H04N 1/46
[52] U.S. Cl. .................... 358/518; 358/539; 358/534; 358/445; 382/166
[58] Field of Search .................... 358/518, 523, 358/524, 539, 534, 433, 432, 445, 426, 261.2, 261.3, 261.4, 430, 533, 467; 382/166, 167

[56] References Cited

U.S. PATENT DOCUMENTS 5,046,119  9/1991  Hoffert et al. ............... 358/433
5,359,438  10/1994  Maeda ....................... 358/539

Primary Examiner—Edward L. Coles, Sr.
Assistant Examiner—Fan Lee
Attorney, Agent, or Firm—Robert Cunha

[57] ABSTRACT

A method for increasing the speed of color conversion from a plurality of color spaces to a single color space by reducing the number of color pixels by a factor of two prior to the color conversion step. This pixel reduction constitutes a lossy data compression scheme which takes advantage of the advance knowledge that the pixels will later undergo anti-aliasing by averaging subsequent to the color conversion. First the pixels are grouped into pairs, and one pixel of each pair is eliminated to form a pseudo halfpixel. The eliminated pixel is replaced with a tag identifying either the previous, current or next pseudo halfpixel. Then each pseudo halfpixel is color converted. Finally the indicated previous, current or next pseudo halfpixel, now color converted, is averaged with the current pseudo halfpixel to form a halfpixel, which is then averaged with the halfpixel above or below it to form an anti-aliased full pixel which can be displayed. The color conversion time of this process is roughly halved since half of the pixels are eliminated before the color conversion step and then effectively added back in after the color conversion step.

2 Claims, 6 Drawing Sheets

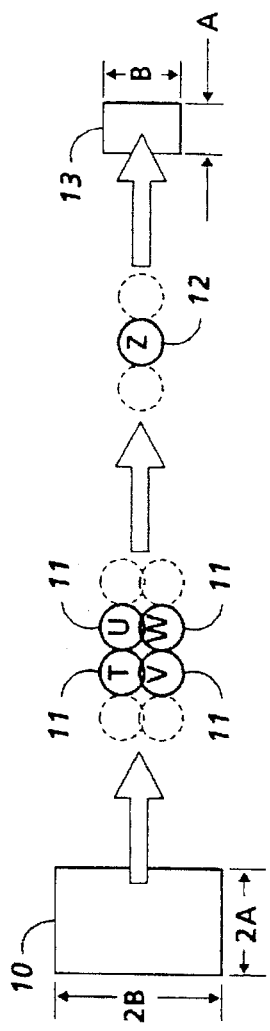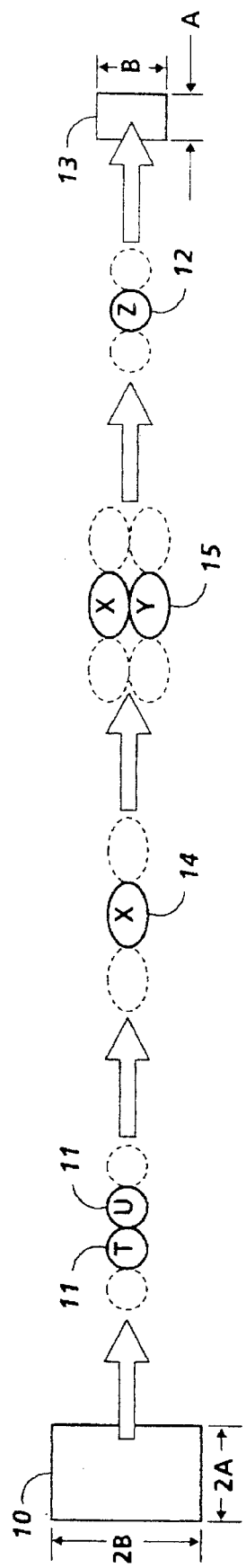

RESULTS OF THIS ENCODING SCHEME

| Previous Subpixel Color Pair: $U_{i-1}$ | Current Subpixel Color Pair: $T_i$ $U_i$ | Next Subpixel Color Pair: $T_{i+1}$ $U_{i+1}$ | Current Pseudo-halfpixel 1st Color: $S_i$ | Current Pseudo-halfpixel 2nd Color: $Tag_i$ | COMMENT |
|---|---|---|---|---|---|
| * * | a a | * * | a | CurrColor | Equal subpixels; Only one color to output. |
| a a | a b | * * | b | PrevColor | Can get 2nd color from previous pseudo-halfpixel. |
| b b | a b | * * | a | PrevColor | Can get 2nd color from previous pseudo-halfpixel. |
| a b | a b | * * | b, if $S_{i-1}=a$; a, if $S_{i-1}=b$ | PrevColor | Can get 2nd color from previous pseudo-halfpixel. |
| b a | a b | * * | b, if $S_{i-1}=a$; a, if $S_{i-1}=b$ | PrevColor | Can get 2nd color from previous pseudo-halfpixel. |
| a d | a b | * * | b, if $S_{i-1}=a$, else pretend $T_{i-1}=c$ and try again | PrevColor if $S_{i-1}=a$, else NextColor | Can sometimes get 2nd color from previous pseudo-halfpixel, otherwise need to try the next pseudo-halfpixel. |
| c a | a b | * * | b, if $S_{i-1}=a$, else pretend $U_{i-1}=d$ and try again | PrevColor if $S_{i-1}=a$, else NextColor | Can sometimes get 2nd color from previous pseudo-halfpixel, otherwise need to try the next pseudo-halfpixel. |
| c b | a b | * * | a, if $S_{i-1}=b$, else pretend $U_{i-1}=d$ and try again | PrevColor if $S_{i-1}=b$, else NextColor | Can sometimes get 2nd color from previous pseudo-halfpixel, otherwise need to try the next pseudo-halfpixel. |
| b d | a b | * * | a, if $S_{i-1}=b$, else pretend $T_{i-1}=c$ and try again | PrevColor if $S_{i-1}=b$, else NextColor | Can sometimes get 2nd color from previous pseudo-halfpixel, otherwise need to try the next pseudo-halfpixel. |
| c d | a b | a a | b | NextColor | Can get 2nd color from next pseudo-halfpixel. |
| c d | a b | b b | a | NextColor | Can get 2nd color from next pseudo-halfpixel. |
| c d | a b | a b | a | NextColor | Can get 2nd color from next pseudo-halfpixel. |
| c d | a b | b a | a | NextColor | Can get 2nd color from next pseudo-halfpixel. |
| c d | a b | a f | a | NextColor | Lose color b from current halfpixel, but help next halfpixel with color a. |
| c d | a b | e a | a | NextColor | Lose color b from current halfpixel, but help next halfpixel with color a. |
| c d | a b | e b | b | NextColor | Lose color a from current halfpixel, but help next halfpixel with color b. |
| c d | a b | b f | b | NextColor | Lose color a from current halfpixel, but help next halfpixel with color b. |
| c d | a b | e f | b | NextColor | Lose color a from current halfpixel, and cannot help next halfpixel |

Legend: a,b,c,d,e,f = distinct (unequal) color values; * = Don'tCare

FIG. 5

ENCODING METHOD FOR DEFERRED ANTI-ALIASING

BACKGROUND

A method for increasing the speed of color conversion during the printing of pages containing images in different color spaces by encoding to reduce the number of pixels by a factor of two prior to the color space conversion step.

In a printing system having low resolution, the boundaries between text letters or computer generated graphics and the background color may be jagged. This is called "aliasing". On the other hand, contone pictures usually have softer outlines, and aliasing is not a problem. For this reason, text and graphics are frequently supplied at higher resolutions than contone.

When combining text and contone in a single page to be printed, the two different pixel densities, when they occur, need to be equalized, and to preserve image quality, it is the contone pixel density that is typically increased up to the density of the text pixel density. Thus, for example, if the contone has a density of A by B pixels per unit area and the text has a density of 2A by 2B pixels, the contone pixels will be increased up to 2A by 2B, by duplicating pixels, before being combined. The resultant picture is not always optimal, so some kind of filtering or image enhancement is usually applied at this stage.

Now the page can be printed, but it frequently happens that the pixel density that the printer can print is less than the density that is being processed, and so the pixel density must be reduced. To continue with the above example, the page, which has been assembled into a 2A by 2B set of pixels must now be printed at a density of A by B. The fundamental challenge in accomplishing this reduction is to minimize any losses in image quality and to prevent aliasing from re-occurring. A common process for doing this is shown in FIG. 1. First, the image 10 can be divided into aligned 2-by-2 blocks of "subpixels" 11, where an aligned block contains four pixels of contone which originated from one original contone pixel, or contains four pixels of text or graphics or background. These are averaged to compute a new "full pixel" 12 which can be printed as the final image 13.

In the situation where the printer can print in full color, —assume CYMK,—there must be a color conversion step to convert all of the color images into one common color space. This is necessary since pixels of different color spaces can not be averaged. Thus, for example, if some of the areas within the image 10 are RGB and some CYMK, then all images scanned into the system in RGB must be converted into CYMK before the subpixels of FIG. 1 can be averaged. This color conversion step, which must be accomplished before the averaging step at the high-density subpixel level, is time consuming because of the larger number of subpixels at the higher density, and will slow down the system throughput if not compensated for. What is required is a faster color conversion process.

SUMMARY OF THE INVENTION

First, it must be taken into consideration that the image is presented to the color converter one scan line at a time. Thus, in the prior art, to average an aligned block of 2 by 2 subpixels, there must be an averaging of the first two subpixels of the aligned set of four subpixels during the first scan, and the storing of partial results for every block, prior to the presentation of the second scan and the completion of the averaging process. This is shown in FIG. 2 where an aligned pair of subpixels 11 from the high resuolution image 10 are averaged to form a first scan halfpixel 14. During the second scan, the second scan halfpixel 15 is computed, and both halfpixels are averaged to form the fullpixel 12. In this situation, the color conversion must occur before the two subpixels are averaged. Thus, more specifically, the problem becomes: how the color conversion process can be speeded up in the situation where the subpixels are still present in pairs in the system.

The solution is based on the concept that there is a fair amount of redundancy in almost all images, and that can be taken advantage of in a process which has an occasional possibility of losses, but where the losses are almost never perceptible to the viewer.

There is redundancy in most images. For example, in the common case of solid color text over a full color picture background, the redundancy of the text portion is clear: any pixel within a text character outline is the same as any other. Also within the picture portion, most pixels are the same or almost the same as neighboring pixels. Thus, if the two subpixels that must be color converted are replaced by one pixel plus a tag pointing to another pixel that can be used later in the averaging process, then the color conversion can be done on the single pixels (with tags) and the averaging process done later by finding the tag-designated pixels and using them in the averaging process. The result is that the number of pixels is reduced from two to one before the color conversion process is performed, and later expanded back to two for the averaging step.

The tag for each pixel in this case need only be a few bits, two in this described embodiment. The set of candidates for tag-designated pixels is therefore small, being confined to the previous and next halfpixels in this described embodiment, but there is usually a neighboring pixel that can be used. Moreover, the system is lossy only where there is no neighbor that has the same color, and this would happen only if there were many different colors within a small local area. This is relatively rare, but also, the production of a wrong color for one pixel where there were many different colors within a small local area would hardly be noticeable to the viewer, especially after the image quality improvement achieved by the anti-aliasing.

To summarize all of the above by the use of a simplified numerical example, assume that two subpixels must be color converted and averaged. The first subpixel to be color converted and averaged has a value of 6 (and is preceeded by several 6'), and the second has a value of 8 (and is followed by a 9). The average value of the two subpixels to be averaged (6 and 8) is therefore 7. To speed up the color conversion process, this invention deletes the first subpixel and substitutes for it a tag that states that in the averaging process, the previous pseudo-halfpixel (with a value of 6) should be used. Hence, the two subpixels have been converted into one pixel (the second pixel) and a tag, and the color conversion is applied to that one pixel.

After color conversion, the pixel designated by the tag (the previous pseudo-halfpixel with a value of 6) is substituted for the tag, and the averaging produces an average of 7 (from the inputs of 6 and 8). This is the same answer as the one that would have been produced with the original two subpixels, and the color conversion process takes half the time it would have otherwise.

BRIEF DESCRIPTION OF THE DRAWINGS

FIG. 1 is a diagram of a simplified prior art anti-aliasing process.

FIG. 2 is a diagram of the prior art process of FIG. 1 showing how it is divided into the processing of two scans in series.

FIG. 5 is a table of the results of the encoding process of this invention.

DETAILED DESCRIPTION OF THE INVENTION

Figure 3:
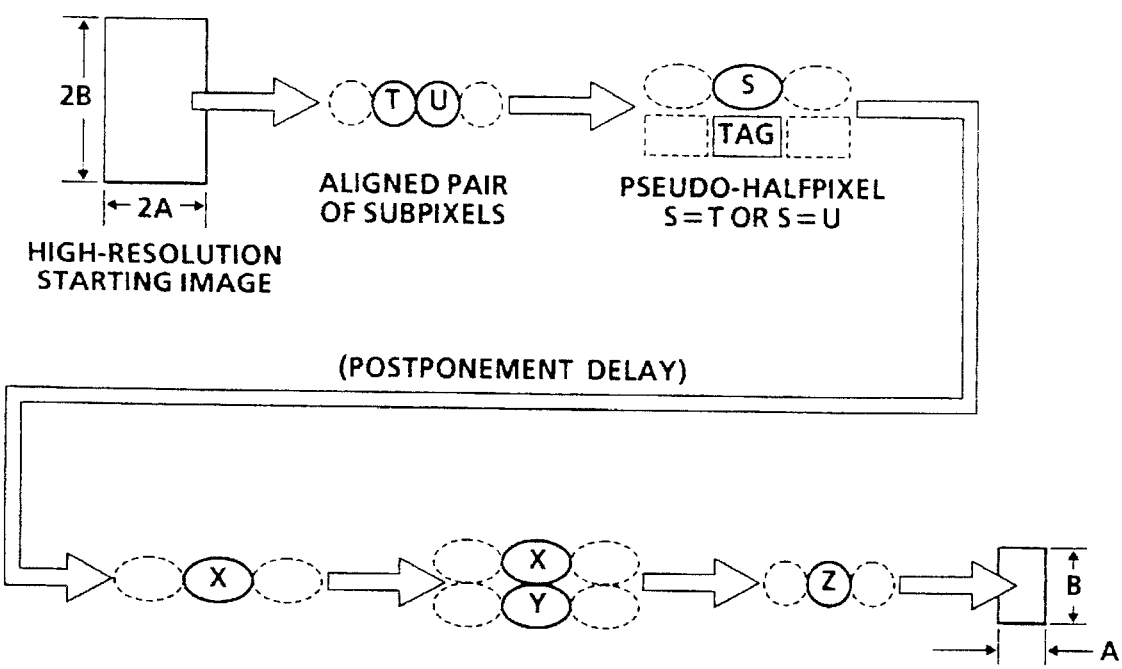
FIG. 3 shows how the process of this invention uses pseudo-halfpixels during the color conversion step.
Figure 4:
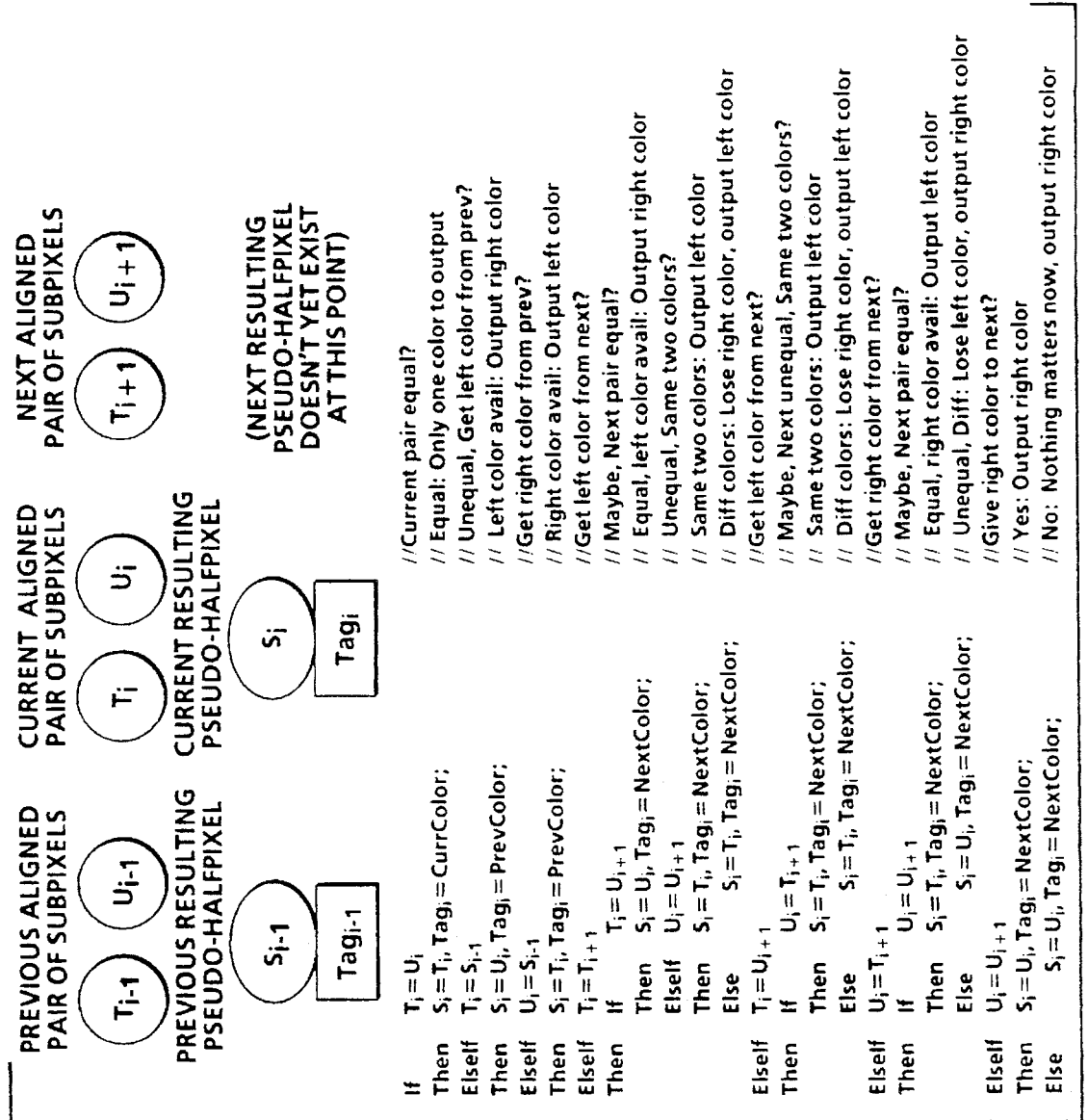
FIG. 4 describes the encoding algorithm of this invention in pseudo-code.

This invention, as shown in FIG. 3, is an improvement over the line by line implementation of the 2×2 anti-aliasing system of FIG. 2. Just as in the original line-by-line approach, it starts by taking an aligned pair of adjacent subpixels, T, U, from the same raster scanline of the starting image. As described above, the next step is color conversion, and here it would be preferable if the stream of subpixel pairs can be reduced to a stream of single subpixels, which would reduce the computation overhead by 50%. This is done by reducing each pair, in turn, to a single pseudo-halfpixel which contains one subpixel and a tag pointing to another pseudo-halfpixel. Some obvious ways to accomplish this are immediately obvious. For example, if the current pair of subpixels are the same color, then only one is needed, and the tag can specify that the same pixel be doubled to two subpixels for the later averaging step. Another simple case is that one of the subpixels is identical to the previously precessed pseudo-halfpixel. In this case, the result would be one subpixel and the tag indicating that the other subpixel in the averaging step should be copied from the previous pseudo-halfpixel. The complete algorithm for deciding on which subpixel should be used for the pseudo-halfpixel, and which other pseudo-halfpixel should be used for the object of the tag is shown in FIG. 4.

The assumption is that a string of pseudo-halfpixels, ... $S_{i-3}$, $S_{i-2}$ and $S_{i\times 1}$ have already been generated from the subpixels ... $T_{i\times 3}$, $T_{i\times 2}$, $T_{i\times 1}$, and ... $U_{i\times 3}$, $U_{i\times 2}$ and $U_{i\times 1}$, before the computation of the current pseudo-halfpixel $S_i$ is started.

The first step is to determine whether the two subpixels are the same. That is, check if $T_i=U_i$. If so, the tag indicates that one subpixel can be used and that the other subpixel is the same, so that $Tag_i$=CurrColor.

If the two subpixels are not the same, then test to see if $T_i=S_{i-1}$. That is, check if the current subpixel $T_i$ is the same as the previously produced pseudo-halfpixel $S_{i-1}$. If it is, then subpixel $U_i$ is used as the pseudo-halfpixel $S_i$, and the tag points to the previous pseudo-halfpixel, so that $S_i=U_i$ and $Tag_i$=PrevColor.

If $T_i$ is not equal to $U_{i-1}$, then $U_i$ is tested to see if it is the same as the previous pseudo-halfpixel, that is, whether $U_i=S_{i-1}$. If so, then Ti is used as the pseudo-halfpixel $S_i$, and the tag points to the previous pseudo-halfpixel. The result of all of the above is that if the subpixels are the same, then one of them can be used for the pseudo-halfpixel, and that if one of them is the same as the previous pseudo-halfpixel, then the previous pseudo-halfpixel can be pointed to by the tag, and the other subpixel used as the pseudo-halfpixel.

If none of the above options are available, then the algorithm starts to compare the current subpixels to the next pair. If $T_i=T_{i+1}$ and $T_i=U_{i+1}$, then the next two subpixels are the same and the current tag can refer to the next pseudo-halfpixel, so that Tagi=NextColor, since the next pseudo-halfpixel will be equal to subpixel $T_i$.

The remainder of the algorithm proceeds as is shown in FIG. 4. In all cases, the pseudo-halfpixel $S_i$ will be set to the color of one of the current subpixels $T_i$ or $U_i$, and the Tag will be set to indicate either the current color (if both subpixels are the same), the color of the previous pseudo-halfpixel, or the color of the next pseudo-halfpixel.

FIG. 5 shows the same information in a different form. The letters a, b c, d, e and f represent any six different colors, and * =don't care. Thus, on the first line of the table, regardless of the colors of the previous and next pair of subpixels, if the current two subpixels are the same color, then the current pseudo-halfpixel will have the same color and the Tag will be Current Color, which means that the subpixel will simply be duplicated to form the other subpixel before averaging.

The second line shows that regardless of the colors of the next subpixel pair, if the two previous subpixels and subpixel $T_i$ are the same color, then $U_i$ will be used as the color of the current pseudo-halfpixel, and the Tag will point to the color of the previous pseudo-halfpixel. All of the other possible options are listed thereafter.

Notice that on lines 6 through 9 of the table, if the test fails, the previous subpixels are assumed to be c and d, and the last 9 lines of the table are used.

Refering back to FIG. 3, each pseudo-halfpixel, S plus tag, in the first line is formed, and the color of each pseudo-halfpixel is converted to the common color space. Then, the tag is used to generate the other subpixel, and the two can be averaged to form halfpixel X. Note that since the previous, current and next pseudo-halfpixels are all now color converted, after the tag is used and before averaging, both subpixels will be in the converted color space even though only one of the subpixels was actually converted. That is the point of this invention.

The process proceeds with the next scanline to produce halfpixel Y, and X and Y are averaged to produce the new fullpixel Z.

Figure 6:
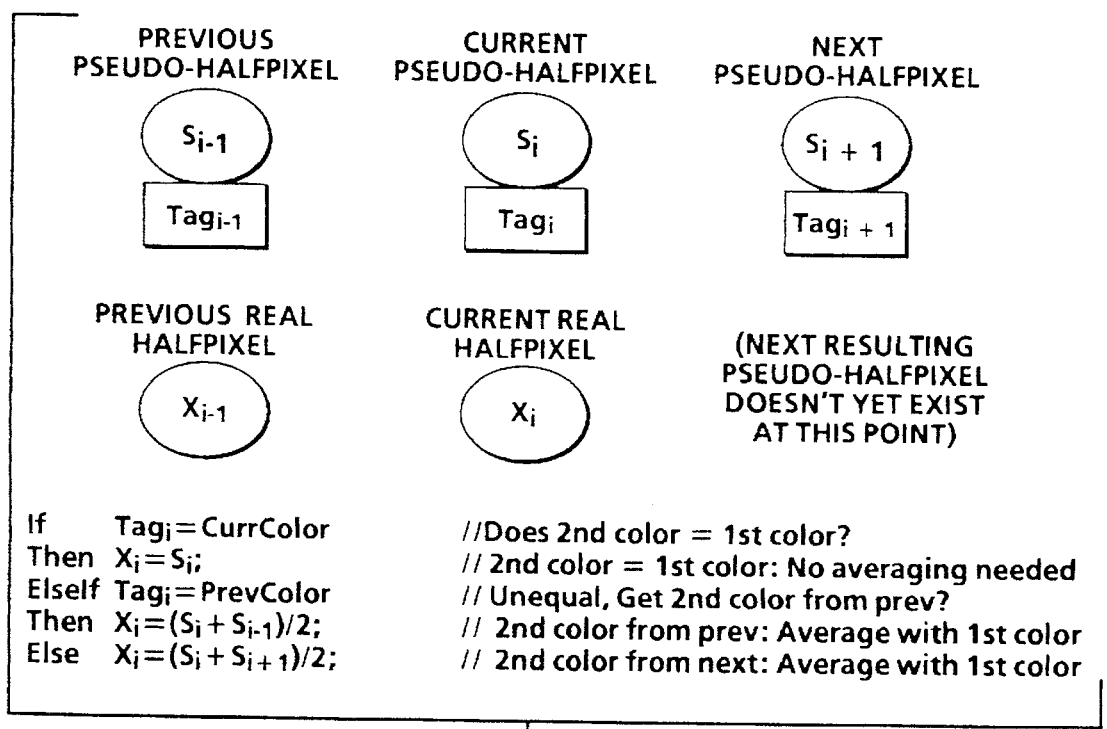
FIG. 6 shows how halfpixels are generated from pseudo-halfpixels in the decoding process of this invention.

As stated above, after color conversion, the current pseudo-halfpixel is used as one of the two subpixels for the purpose of averaging while the tag is used to get the other subpixel. FIG. 6 shows this algorithm. If the two subpixels were the same color (CurrColor), the average is equal to either subpixel, so nothing else is required. If the tag= PrevColor, the color of the previous pseudo-halfpixel is used. Otherwise, the color of the next pseudo-halfpixel is used. This operation converts one color converted pseudo-halfpixel into two color converted subpixels.

Figure 7:
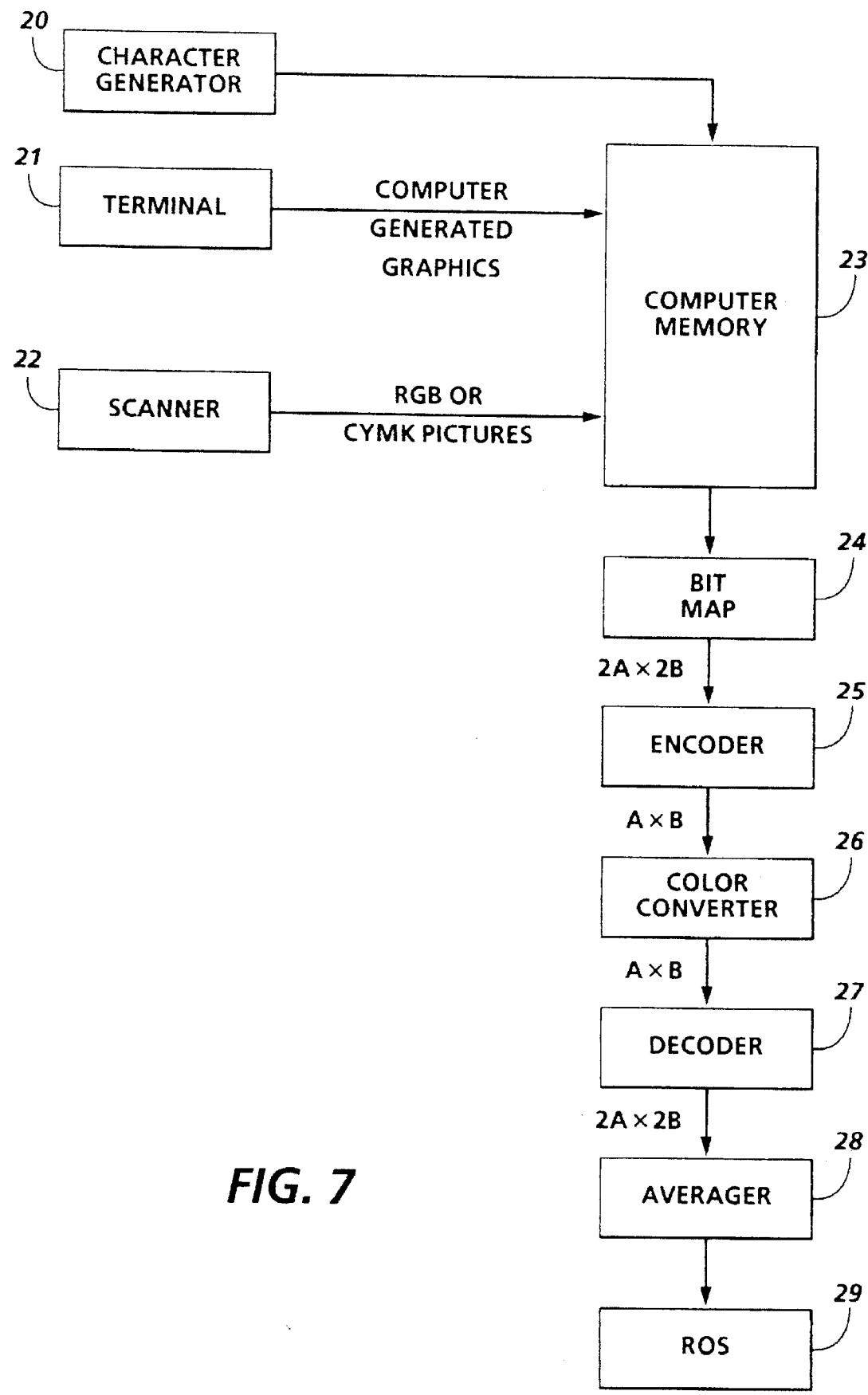
FIG. 7 shows a resultant system that implements the process of this invention.

The resultant system is shown in FIG. 7. A computer 23 receives full color image data from a character generator 20, a terminal 21 which generates computer generated graphics and a scanner 22 which scans in pictures. The computer will compose a page in the form of a bit map 24 having any combination of data, including text or graphics over pictures. Assume the bit map is 2A by 2B pixels per unit area, and is output one scan line at a time. Within each scanline, each aligned set of two subpixels is encoded in encoder 25 according to the process described herein into one pseudo-halfpixel to yield a density of A by B pixels per unit area, which is color converted 26 if necessary. The decoder 27 then expands each pseudo-halfpixel back into two subpixels, and these are averaged 28 to form the final image which is printed on a Raster Output Scanner 29.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of scanning a picture, the pixels of said picture being in a plurality of input color spaces and a plurality of input pixel densities, to produce a scanline of pixels comprising previous, current and next pixels, and displaying said scanline in a single output color space and a single output pixel density, the processing of each current pixel comprising the steps of:

scanning said picture to generate said scanline of pixels in said plurality of color spaces and said plurality of pixel densities, replicating and then resampling said pixels to generate a scanline of aligned pairs of subpixels in said single output pixel density, converting each said aligned pair of subpixels into a pseudo-halfpixel by deleting one subpixel and adding a tag which identifies either the previous, the current, or the next pseudo-halfpixel, converting said pseudo-halfpixel into the said single output color space, averaging the converted pseudo-halfpixel with the pseudo-halfpixel identified by said tag to produce a halfpixel, and displaying said halfpixel.

2. A method of scanning a picture, the pixels of said picture being in a plurality of input color spaces and a plurality of input pixel densities, to produce a scanline of pixels comprising previous, current and next pixels, and displaying said scanline in a single output color space and a single output pixel density, the processing of each current pixel comprising the steps of:

scanning said picture to generate said scanline of pixels in said plurality of color spaces and said plurality of pixel densities, replicating and then resampling said pixels in two directions to generate two scanlines of subpixels in said single output pixel density, each said scanline consisting of aligned pairs of said subpixels, converting each aligned pair of subpixels into a pseudo-halfpixel by deleting one subpixel and adding a tag which identifies either the previous, the current, or the next pseudo-halfpixel in the same scanline, converting said pseudo-halfpixels into said single output color space, averaging each converted pseudo-halfpixel with the pseudo-halfpixel identified by said tag to produce a halfpixel, averaging each said halfpixel from the first said scanline with the corresponding said halfpixel from the second said scanline to produce a fullpixel, and displaying said fullpixel.

* * * * *